United States Patent [19]

Tsutsumi et al.

[11] Patent Number: 5,206,204
[45] Date of Patent: Apr. 27, 1993

[54] ABSORBENT FOR LOWER ALDEHYDES

[75] Inventors: Yoshio Tsutsumi, Takatsuki; Kazumi Matsuura, Itami; Katsuya Noguchi, Toyonaka, all of Japan

[73] Assignee: Takeda Chemical Industries, Ltd., Osaka, Japan

[21] Appl. No.: 794,016

[22] Filed: Nov. 19, 1991

[30] Foreign Application Priority Data

Nov. 30, 1990 [JP] Japan .................. 2-338862
Aug. 26, 1991 [JP] Japan .................. 3-213890

[51] Int. Cl.$^5$ .............................................. B01J 20/22
[52] U.S. Cl. .................. 502/401; 423/245.1; 502/62
[58] Field of Search .................. 502/401, 62

[56] References Cited

U.S. PATENT DOCUMENTS 3,453,807  7/1969  Taylor ................ 502/401 X
4,204,980  5/1980  Pasha et al. ............. 502/407

FOREIGN PATENT DOCUMENTS 60-132645  7/1985  Japan .
60-54095  11/1985  Japan .
61-20330   5/1986  Japan .
63-24413   5/1988  Japan .

Primary Examiner—Patrick P. Garvin
Attorney, Agent, or Firm—Wenderoth, Lind & Ponack

[57] ABSTRACT

The present invention relates to adsorbents for lower aldehydes which comprises a saturated cyclic secondary amine and a porous carrier therefor.

The adsorbent according can eliminate lower aldehydes efficiently at ordinary temperature over a long period and, furthermore, is inexpensive. And the adsorbents, wherein a halogenide of alkali metal or alkaline earth metal is further supported on the porous carrier, have an excellent heat resistance.

12 Claims, 1 Drawing Sheet

ABSORBENT FOR LOWER ALDEHYDES

The present invention relates to an adsorbent having favorable adsorbent characteristics for lower aldehydes such as formaldehyde and acetaldehyde.

BACKGROUND OF THE INVENTION

Lower aldehydes, typically formaldehyde, acetaldehyde, etc., are harmful gases having a characteristic irritating odor. For formaldehyde, an acceptable air concentration level of 0.5 ppm has been tentatively provided, and acetaldehyde has been designated as a malodorous substance in Japan.

Sources of formaldehyde include, among others, formaldehyde-producing plants, plants producing resins starting with urea, melamine, phenol or the like and formaldehyde, processing plants in which such resins are used and, further, factories manufacturing various products, for example building materials and furniture, using said resins. It is said that formaldehyde is generated from formalin used in hospitals as a disinfectant or by incomplete combustion in kerosene stoves and that collateral streams of tobacco or cigarette smoke also contains formaldehyde in fair amounts.

Acetaldehyde sources include plants for the production of acetaldehyde and derivatives thereof and, further, acetaldehyde is formed upon heat treatment of sewage sludge and is contained also in the mainstream of tobacco or cigarette smoke.

In recent years, the hazard and odor features of these lower aldehydes have become problems from the viewpoints of improved working environment and better living environment, and efficient hazard elimination measures have been eagerly demanded.

The adsorbents so far used for lower aldehydes include, among others, active carbon, activated clay, silica gel, activated alumina, and clay minerals and, among them, active carbon has been more often than not employed. These adsorbents, typically active carbon, as such, have drawbacks from the characteristics viewpoint; for example, they are poor in adsorbency for lower aldehydes, such as formaldehyde and acetaldehyde, and have a short service life.

As a measure for achieving improvements in these respects, it has already been proposed to have supported on such adsorbents a compound reactive with lower aldehydes. Examples of such compound are organic compounds such as hydrazines, aliphatic amines (Japanese Published Examined Patent Application No. 63-24413), aromatic amines (Japanese Published Unexamined Patent Application No. 60-132645) and ureas, and inorganic compounds such as ammonium salts, sulfites, oxides and hydroxides of alkali metals, alkaline earth metals, etc., iodine, bromine, and compounds of iodine or bromine with alkali metals or alkaline earth metals (Japanese Published Examined Patent Application No. 61-20330).

It has also been proposed that the above-mentioned adsorbents should carry a platinum group metal compound.

However, the adsorbents carrying an organic compound have problems from the following viewpoints: time-course stability, hazardousness, heat resistance and odor of the organic compound, among others. In particular, the adsorbent carrying aniline (Japanese Published Examined Patent Application No. 60-54095) is disadvantageous in that aniline itself has poor time-course stability in adsorbing lower aldehydes. Furthermore, aniline is a suspected carcinogen. For these reasons, it has been difficult to put such adsorbent into practical use.

The adsorbents carrying an inorganic compound are insufficient in the rate of adsorption of lower aldehydes occurring in low concentrations. As regards the catalyst carrying adsorbents, the catalyst is expensive and the elimination effect at ordinary temperature is low.

Thus, none of the prior art adsorbents can be regarded as being a satisfactory medium for elimination of lower aldehydes.

The object of the invention is to provide an adsorbent capable of eliminating lower aldehydes efficiently for a long period and which has an excellent heat resistance.

DETAILED DESCRIPTION OF THE INVENTION

Figure 1:
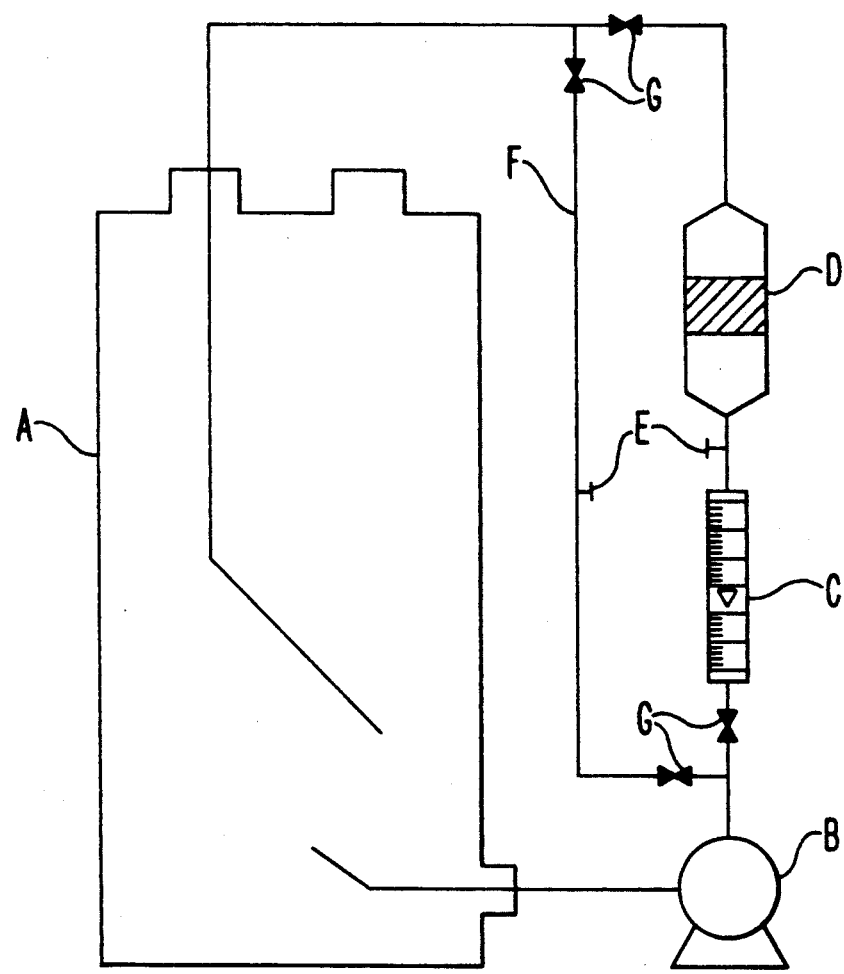

In view of the above state of the art, the present inventors made intensive investigations and, as a result, found that when a certain organic compound is caused to be supported on a porous carrier, a stable, safe and inexpensive adsorbent capable of efficiently eliminating lower aldehydes at ordinary temperature is obtained and, based on this finding, they have completed the present invention.

Thus, the invention provides an adsorbent for lower aldehydes which comprises a saturated cyclic secondary amine and a porous carrier therefor.

The secondary amine to be used in the invention is represented by the formula (I),

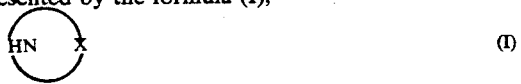

wherein X represents an alkylene group which may be interrupted with a hetero atom. Preferably the carbon number range of the above-mentioned alkylene is from 3 to 5, and the above-mentioned hetero atom is selected from O, S, N optionally having a $C_{1-4}$ alkyl, such as methyl, ethyl, propyl, isopropyl, butyl, isobutyl, etc.

Furthermore, X may be represented by the formula $-(CH_2)_n-Y-CH_2CH_2-$, wherein n denotes 1 or 2, Y stands for $CH_2$, O, S, N—R (wherein R stands for hydrogen or $C_{1-4}$ alkyl, such as methyl, ethyl, propyl, isopropyl, butyl, isobutyl, etc.).

The saturated cyclic secondary amine to be used in accordance with the invention is preferably a five-membered or six-membered one.

And, it is preferable that the amine contains a-hetero atom, for example N, O and S, etc., in the ring in addition to N of the secondary amine.

Usable as the five-membered saturated cyclic secondary amine are, for example, pyrrolidine and thiazolidine.

Usable as the six-membered saturated cyclic secondary amine are, for example, piperidine, piperazine, N-methylpiperazine, morpholine and thiomorpholine.

Among the saturated cyclic secondary amines mentioned above, piperidine, piperazine and morpholine are particularly preferred.

The range of the amount of the amine to be added to the porous carrier is 1 to 50% by weight, preferably 5 to 20% by weight, on the anhydrous porous carrier basis.

The porous carrier to be used in the practice of the invention may be any of the commercially available carriers without any particular limitation, thus including active carbon, activated clay, silica gel, activated alumina, clay minerals and so forth, although active carbon is particularly preferred.

As the clay minerals, there may be mentioned sepiolite, attapulgite, halloysite, allophane and the like, which have one-dimensional structures (fibrous structures), as well as montmorillonite, bentonite, vermiculite, talc, mica and the like, which have two-dimensional structures (sheet-like structures).

As regards the shape or form of the porous carrier, the carrier may occur, for example, as a powder, a randomly crushed mass, cylindrical or spherical granules, or a molding having a honeycomb structure as prepared in advance.

For causing the above-mentioned amine to be supported on the porous carrier, the following methods may be used depending on whether the amine is soluble in water or not.

When the saturated cyclic secondary amine is soluble in water: (1) The method comprising dissolving the amine in advance and immersing the porous carrier in the aqueous solution. (2) The method comprising spraying or sprinkling aqueous solution of the amine upon the porous carrier with stirring. (3) The method comprising mixing the porous carrier in powder form with the aqueous solution of the amine, with a binder added as necessary, and granulating or otherwise molding the resulting mixture.

When the saturated cyclic secondary amine is insoluble in water: (1) The method comprising mixing the porous carrier in powder form with the amine in powder form in advance, adding water and a binder, and granulating or otherwise molding the resulting mixture. (2) The method comprising adding the amine and a binder to water in advance to give a slurry and mixing this slurry with the porous carrier by spraying or sprinkling.

The binder to be used as necessary in the above-mentioned methods of causing the amine to be carried on the porous carrier is, for example, carboxymethylcellulose, polyvinyl alcohol, or gum arabic. The level of addition of the binder should desirably be as low as possible.

The porous carrier now carrying the above-mentioned compound is generally dried in the conventional manner, for example by stationary drying or through-flow drying, in an air bath maintained at about 100° C. and then put to use.

When a halogenide of an alkali metal or an alkaline earth metal is further supported on the porous carrier, an adsorbent having excellent heat resistance is obtained.

Usable as the alkali metal to form the halogenide are, for example, lithium, sodium and potassium.

Usable as the alkaline earth metal to form the halogenide are, for example, magnesium and calcium.

Usable as the halogen are, for example, iodine and bromide.

The range of the amount of the halogenide of alkali metal or alkaline earth metal is 0.5 to 20% by weight, preferably 1 to 10% by weight, on the anhydrous porous carrier basis.

The halogenide of alkali metal or alkaline metal is supported on the porous carrier by the same method as a saturated cyclic secondary amine is. The halogenide and the amine are supported at the same time or one after the other.

The thus-obtained adsorbent can be applied to various uses in the same manner as the conventional adsorbents. Thus, for instance, it can be used in various forms, for example in the form of nonwoven fabric, polyurethane foam, paper, honeycomb-like or other molded and processed boards and blocks, to achieve air cleaning in cars, coffee shops, meeting rooms, workshops, household living rooms and the like where the atmosphere tends to be contaminated with lower aldehydes such as formaldehyde and acetaldehyde. When used in a cigarette filter, the adsorbent can efficiently remove harmful and/or irritating components in tobacco smoke, such as formaldehyde and acetaldehyde.

While formaldehyde and acetaldehyde are typical examples of lower aldehydes, propionaldehyde, acrolein, n-butyraldehyde, i-butyraldehyde, 3-methylbutyraldehyde, crotonaldehyde and the like, which have a boiling point not higher than about 100° C. are also targets of malodor control measures, for which effective adsorbents are required. The adsorbent of the present invention can be expected to be effective against these aldehydes as well. The adsorbent of the invention is effective against acetaldehyde among others.

The following examples are further illustrative of the present invention.

EXAMPLES

Example 1

Dried granulated wood-derived active carbon with a BET surface area of 1,200 m$^2$/g and a grain size of 6 to 8 mesh was used as the porous carrier. Said active carbon (100 g) was placed in a one-liter desk mixer. Separately, 10 g or 15 g of piperidine was weighed and dissolved in 50 ml of water. While the desk mixer was in operation, the whole of the above piperidine solution was sprayed on the active carbon.

The adsorbents prepared are shown in Table 1 together with a control (carrying none).

TABLE 1

| Sample No. | Amount of piperidine carried (g/100 g active carbon) |
| --- | --- |
| 1 | 0 (Control) |
| 2 | 10 |
| 3 | 15 |

The thus-obtained adsorbents were evaluated for adsorbency for acetaldehyde by the method mentioned below.

Method of measuring acetaldehyde-adsorbing capacity

The measurement was performed using an adsorption test apparatus of the gas circulation type as schematically illustrated in FIG. 1 under the following conditions.

Measurement procedure (1) Operate the gas flow path selection valve (G) to secure the bypass line (F) and set the sample column (D) packed with a sample on the apparatus.

(2) While operating the diaphragm pump (B) to circulate air within the gas holder (A), inject a definite amount of acetaldehyde into the gas flow line through the gas sampling hole (E).

(3) while maintaining the gas circulation, take a sample of the gas through the gas sampling hole (E) and analyze the sample for gas concentration by gas chromatography.

(4) After the gas concentration has become steady, operate the gas flow path selection valve (G) to change the gas flow path to the sample column (D) side, take a sample of the gas at definite time intervals, and determine the change in gas concentration with time.

Measurement conditions

Gas concentration: 10±1 ppm (acetaldehyde)
Gas temperature: 25°±2° C.
Gas humidity: 50±10%
Gas flow rate: 17.3 liters/min
Sample packing layer: 35 mm $\phi$, 4 mm H (3.85 ml)
Gas flow speed: 30 cm/sec Measurement results The percent residual gas component was determined for each sample shown in Table 1 and for a blank test from the aldehyde gas concentration C at 30 minutes after changeover of the gas flow path selection valve G to the sample column D side and the gas concentration Co before changeover, as follows:

$C/Co \times 100$ (%).

The results are shown in Table 2.

TABLE 2

| Acetaldehyde-adsorbing capacity | |
|---|---|
| Sample No. | Residual acetaldehyde (%) |
| Blank | 99.5 |
| 1 | 86.8 |
| 2 | 5.0 |
| 3 | 2.5 |

EXAMPLE 2

Using piperazine as the component to be carried and following the procedure of Example 1, the piperazine-carrying active carbon adsorbents shown in Table 3 were obtained.

TABLE 3

| Sample No. | Amount of piperazine carried (g/100 g active carbon) |
|---|---|
| 4 | 0 (Control) |
| 5 | 10 |
| 6 | 15 |

The adsorbents obtained were each subjected to acetaldehyde adsorbing capacity measurement under the same conditions as used in Example 1.
The results are shown in Table 4.

TABLE 4

| Acetaldehyde-adsorbing capacity | |
|---|---|
| Sample No. | Residual acetaldehyde (%) |
| Blank | 99.5 |
| 4 | 87.0 |
| 5 | 6.5 |
| 6 | 3.0 |

EXAMPLE 3

Using morpholine as the component to be carried and following the procedure of Example 1, the morpholine-carrying active carbon adsorbents shown in Table 5 were obtained.

TABLE 5

| Sample No. | Amount of morpholine carried (g/100 g active carbon) |
|---|---|
| 7 | 0 (Control) |
| 8 | 10 |
| 9 | 15 |

The adsorbents obtained were each subjected to acetaldehyde-adsorbing capacity measurement under the same conditions as used in Example 1. The results are shown in Table 6.

TABLE 6

| Acetaldehyde-adsorbing capacity | |
|---|---|
| Sample | Residual acetaldehyde (%) |
| Blank | 99.5 |
| 7 | 87.5 |
| 8 | 4.5 |
| 9 | 2.0 |

EXAMPLE 4

Using piperidine, piperazine or morpholine as the component to be carried and potassium iodide as the halogenide of alkali metal or alkaline earth metal, and following the procedure of Example 1, the active carbon adsorbents shown in Table 7 were obtained. The saturated cyclic secondary amine and potassium iodide are supported on the active carbon at same time.

TABLE 7

| Sample No. | Kind and amount of the saturated cyclic secondary amine (g/100 g active carbon) | | Amount of potassium iodide (g/100 g active carbon) |
|---|---|---|---|
| 10 | piperidine | 10 | 2 |
| 11 | piperazine | 10 | 2 |
| 12 | morpholine | 10 | 2 |

The adsorbents obtained as the above and the adsorbents of which sample Nos. are 1,2,5 and 8 were left for 7 days in an air bath dryer maintained at 60° C. and were then removed. These adsorbents were each subjected to acetaldehyde-adsorbing capacity measurement under the same conditions as used in Example 1. The result are shown Table 8.

TABLE 8

| Acetaldehyde-adsorbing capacity | |
|---|---|
| Sample No. | Residual acetaldehyde (%) |
| Blank | 99.5 |
| 1 | 86.9 |
| 2 | 85.0 |
| 5 | 75.1 |
| 8 | 68.3 |
| 10 | 14.0 |
| 11 | 10.1 |
| 12 | 7.0 |

EXAMPLE 5

Using morpholine as the component to be carried and potassium bromide, calcium bromide or potassium iodide as the halogenide of alkali metal or alkaline earth metal, and following the procedure of Example 4, the active carbon adsorbents shown in Table 9 were obtained.

TABLE 9

| Sample No. | Amount of morpholine (g/100 g active carbon) | Kind and Amount of the halogenide of alkali metal or alkaline earth metal (g/100 g active carbon) | |
| --- | --- | --- | --- |
| 13 | 10 | potassium bromide | 1 |
| 14 | 10 | potassium bromide | 2 |
| 15 | 10 | potassium bromide | 5 |
| 16 | 10 | calcium bromide | 1 |
| 17 | 10 | calcium bromide | 2 |
| 18 | 10 | calcium bromide | 5 |
| 19 | 10 | potassium iodide | 1 |
| 20 | 10 | potassium iodide | 5 |

The adsorbents obtained as the above were left for 7 days in an air bath dryer maintained at 60° C., and they were then removed from the dryer. These adsorbents were each subjected to acetaldehyde-adsorbing capacity measurement under the same conditions as used in Example 1. The result are shown Table 10.

TABLE 10

| | Acetaldehyde-adsorbing capacity |
| --- | --- |
| Sample No. | Residual acetaldehyde (%) |
| Blank | 99.5 |
| 13 | 16.2 |
| 14 | 15.0 |
| 15 | 14.8 |
| 16 | 10.6 |
| 17 | 9.3 |
| 18 | 7.0 |
| 19 | 8.3 |
| 20 | 6.0 |

The adsorbent according to the invention can eliminate lower aldehydes efficiently at ordinary temperature over a long period and, furthermore, is inexpensive. And the adsorbents according to the invention, wherein a halogenide of alkali metal or alkaline earth metal is further supported on the porous carrier, have an excellent heat resistance.

The adsorption test apparatus of the gas circulation type as used in acetaldehyde-adsorbing capacity measurement in the examples is shown in FIG. 1.

In the Figure:
A: Gas holder
B: Diaphragm pump
C: Flowmeter
D: Sample column
E: Gas sampling hole
F: Bypass

What is claimed is:

1. An adsorbent for lower aldehyde which comprises a saturated cyclic secondary amine and a halogenide of an alkali metal or alkaline earth metal supported on a porous carrier.

2. The adsorbent as claimed in claim 1, wherein the secondary amine is represented by the formula (I),

(I)

wherein X represents an alkylene group which may be interrupted with a hetero atom.

3. The adsorbent as claimed in claim 2, wherein X represents a $C_{3-5}$ alkylene group which may be interrupted with O, S or N optionally having a $C_{1-4}$ alkyl.

4. The adsorbent as claimed in claim 2, wherein the alkylene group is a group of the formula $-(CH_2)_n-Y-CH_2CN_2-$, wherein n denotes 1 or 2 and Y stands for $CH_2$, O, S or N—R wherein R stands for $C_{1-4}$ alkyl.

5. The adsorbent as claimed in claim 1, wherein the secondary amine is five-membered or six-membered.

6. The adsorbent as claimed in claim 1, wherein the secondary amine contains a hetero atom in the ring in addition to N of the secondary amine.

7. The adsorbent as claimed in claim 1, wherein the secondary amine is piperidine, piperazine or morpholine.

8. The adsorbent as claimed in claim 1, wherein the range of amount of the secondary amine is 1 to 50% by weight on the anhydrous porous carrier basis.

9. The adsorbent as claimed in claim 1, wherein the range of amount of the secondary amine is 5 to 20% by weight on the anhydrous porous carrier basis.

10. The adsorbent as claimed in claim 1, wherein the porous carrier is active carbon.

11. The adsorbent as claimed in claim 1, wherein the amount of the halogenide is 0.5 to 20% by weight.

12. The adsorbent as claimed in claim 1, wherein the amount of the halogenide is 1 to 10% by weight.

* * * * *